(12) United States Patent
Borntraeger et al.

(10) Patent No.: US 9,529,616 B2
(45) Date of Patent: *Dec. 27, 2016

(54) MIGRATING PROCESSES BETWEEN SOURCE HOST AND DESTINATION HOST USING A SHARED VIRTUAL FILE SYSTEM

(71) Applicant: International Business Machines Corporation, Armonk, NY (US)

(72) Inventors: Christian Borntraeger, Stuttgart (DE); Heiko Carstens, Holzgerlingen (DE); Dominik Dingel, Boeblingen (DE); Matthias Klein, Boeblingen (DE); Einar Lueck, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 448 days.

This patent is subject to a terminal disclaimer.

(21) Appl. No.: 14/101,498

(22) Filed: Dec. 10, 2013

(65) Prior Publication Data
US 2015/0160962 A1   Jun. 11, 2015

(51) Int. Cl.
| | |
|---|---|
| *G06F 9/455* | (2006.01) |
| *G06F 12/10* | (2016.01) |
| *H04L 29/08* | (2006.01) |
| *G06F 9/48* | (2006.01) |
| *G06F 9/50* | (2006.01) |

(52) U.S. Cl.
CPC ......... *G06F 9/45558* (2013.01); *G06F 9/4856* (2013.01); *G06F 9/5077* (2013.01); *G06F 12/1009* (2013.01); *H04L 67/1008* (2013.01); *G06F 9/45533* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS 6,205,528 B1 * 3/2001 Kingsbury .......... G06F 12/1072
  711/153
6,263,414 B1   7/2001 Itzkovitz et al.
(Continued)

OTHER PUBLICATIONS

Gelado et al., "An Asummetric Distributed Shared Memory Model for Heterogeneous Parallel Systems," Proceedings of the fifteenth edition of ASPLOS on Architectural support for programming languages and operating systems, Mar. 13-17, 2010, pp. 347-358, Pittsburgh, Pennsylvania, Copyright 2010 ACM.
(Continued)

*Primary Examiner* — Mengyao Zhe
*Assistant Examiner* — James J Lee
(74) *Attorney, Agent, or Firm* — Brian Welle

(57) ABSTRACT

A process can be scheduled between first and second hosts that using a virtual file system that is shared between the hosts can be used. The process, running on a first hypervisor of the first host, can be scheduled to run on a second hypervisor of the second host. A file can be created that includes the data content of the process address space for the file. The file can be mapped address space of the virtual file system. Data from the physical memory of the first host can be transferred to physical memory of the second host using page fault routines.

7 Claims, 5 Drawing Sheets

(56) References Cited

U.S. PATENT DOCUMENTS

| | | | |
|---|---|---|---|
| 6,766,424 B1* | 7/2004 | Wilson | G06F 12/0813 711/148 |
| 6,829,637 B2 | 12/2004 | Kokku et al. | |
| 7,200,734 B2 | 4/2007 | Hyser | |
| 7,574,567 B2 | 8/2009 | Wyman | |
| 7,596,654 B1 | 9/2009 | Wong | |
| 7,734,890 B2* | 6/2010 | Morris | G06F 12/0284 711/202 |
| 7,756,943 B1* | 7/2010 | Wong | G06F 9/544 709/212 |
| 7,979,645 B2 | 7/2011 | Motohashi | |
| 8,359,453 B2 | 1/2013 | Funk | |
| 2005/0273571 A1* | 12/2005 | Lyon | G06F 9/45537 711/203 |
| 2008/0120474 A1* | 5/2008 | Hastings | G06F 12/109 711/147 |
| 2009/0089537 A1 | 4/2009 | Vick et al. | |
| 2010/0138744 A1* | 6/2010 | Kamay | G06F 9/4445 715/716 |
| 2010/0217916 A1* | 8/2010 | Gao | G06F 12/109 711/6 |
| 2011/0296411 A1* | 12/2011 | Tang | G06F 9/45545 718/1 |
| 2012/0017031 A1* | 1/2012 | Mashtizadeh | G06F 9/45558 711/6 |
| 2012/0102258 A1* | 4/2012 | Hepkin | G06F 9/45558 711/6 |
| 2012/0131038 A1* | 5/2012 | Aronovich | G06F 11/1435 707/769 |
| 2012/0144135 A1* | 6/2012 | Aronovich | G06F 12/08 711/162 |
| 2014/0281358 A1* | 9/2014 | Duluk, Jr. | G06F 11/073 711/206 |

OTHER PUBLICATIONS

Liu et al., "DTHREADS: Efficient Deterministic Multithreading," Proceedings of the Twenty-Third ACM Symposium on Operating Systems Principles, Oct. 23-26, 2011, pp. 327-336, Cascais, Portugal, Copyright 2011 ACM.
Unknown, "Xpmem," Cross-Process Memory Mapping, Google code Nov. 7, 2011 //code.google.com/p/xpmem/.

* cited by examiner

MIGRATING PROCESSES BETWEEN SOURCE HOST AND DESTINATION HOST USING A SHARED VIRTUAL FILE SYSTEM

BACKGROUND

This disclosure relates to scheduling a process to operate on different hosts. In particular, it relates to scheduling a process running on a first host to run on a second hosts and to move process data stored in memory of the first host to the second host.

Symmetric multiprocessing (SMP) architectures allow two or more processors, or processor cores, to share a single shared memory. SMP can also allow processors to share access to input/output (I/O) devices and to be controlled by a single OS instance. In certain embodiments, each processor can be treated equally. SMP systems can therefore be useful for providing processes with access to a pool of shared hardware, including processors, memory and I/O devices. The different hardware components can be connected through a system bus, network, crossbar switch or similar interconnection mechanism.

Non-uniform memory access (NUMA) memory can be used with multiprocessing, where the memory access time depends on the memory location relative to a processor. Under NUMA access times to different portions of main memory can be different depending upon the physical hardware that stores the desired data. For instance, a processor located on a first host may be able to access local memory faster than memory stored on another host.

SUMMARY

A method and system for scheduling a process between first and second hosts that using a virtual file system that is shared between the hosts can be used. The method and system can relate to: scheduling the process, running on a first hypervisor of the first host, to run on a second hypervisor of the second host; identifying a process address space for the process; creating a file that includes the data content of the process address space; mapping the file to address space of the virtual file system; generating, in response to the process running on the second hypervisor requesting access to the file, a page fault; determining that the memory access request is for data that is stored in physical memory of the first host; and transferring, in response to the determining, the data from the physical memory of the first host to physical memory of the second host.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

Figure 1:
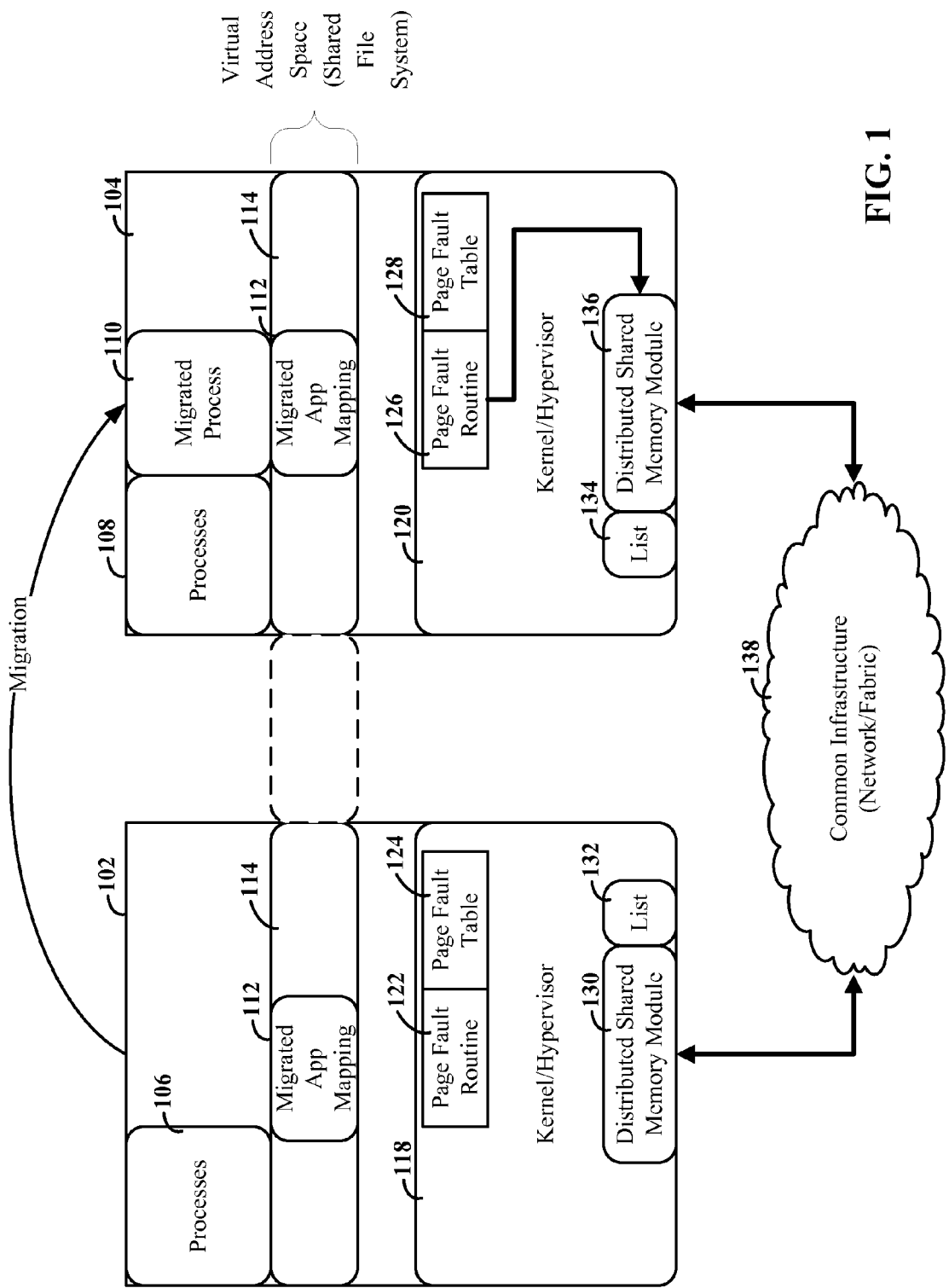
FIG. 1 depicts a block diagram of a system configured to schedule applications between multiple hosts, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to scheduling processes to run on different hosts, more particular aspects relate to managing memory transfer for a process that is scheduled to run on a new host. While the present disclosure is not necessarily limited to such applications, various aspects of the disclosure may be appreciated through a discussion of various examples using this context.

Embodiments of the present disclosure are directed toward a system that provides distributed shared memory (DSM) between two or more hosts. The system can be configured to schedule processes between the hosts (e.g., to allow for load balancing), while providing a memory management solution for handling memory of a process that is migrated from one (source) host to another (target) host.

Certain embodiments are directed toward moving process data stored in memory of a source host to a target host as the memory is accessed by the migrated process. In this manner, the memory can be moved as necessary (e.g., as opposed to moving all memory in a single bulk operation). For instance, a virtual file system can have use an address space that is shared between the source and target host. The system can create a file that maps to the address space of the process. This file can then be mapped into the address space of the virtual file system (e.g., as physical memory of a virtual machine and virtual memory of the new host). The page table of the virtual machine on the target host will indicate that the contents of the file are not locally in local memory. Accordingly, when the migrated process attempts to access the file at the target host, an exception can be generated for requested data, which resides in the memory of the source host. The system can then be configured to retrieve the requested data from the source host using distributed shared memory (DSM).

In particular embodiments, an exception of the file system can result in the calling of a page fault handling routine of the file system. The page fault routine can interface with a DSM module, which can determine that the requested page resides in the physical memory of the source host. For instance, the DSM module can maintain and consult a list that identifies pages that reside on the source host. The DSM module can then establish a connection with a DSM module of source host and request the desired page. The DSM module of the source host can provide the requested page. The received page can then be mapped in to process address space and the lists of the DSM modules can be updated accordingly.

Embodiments are discussed herein with respect to a Linux® operating system/kernel; however, aspects of the present disclosure are not necessarily so limited and various aspects of the disclosure can be used in combination with other operating systems. The Linux kernel can implement a Virtual File System (VFS) that facilitates separation of actual file system code from the rest of the kernel. The kernel can maintain files using index nodes (Modes) and directory entries (dentries).

According to various embodiments, the file created from the process address space can be mapped into the address space of the file system using a system command such as mmap( ) When a file is mapped into memory using mmap, the Linux kernel can create entries in the page tables to allow for detection of when portions of the mapped memory are accessed (read or written). Attempting to access portions that are not located in (local) physical memory can result in page faults. A kernel routine can then be called to load the requested portions into physical memory. Consistent with embodiments, this can include the use of a DSM module configured to interface the kernel module and to retrieve data from memory located on a source host. The local page tables can then be updated.

Various aspects of the present disclosure are directed toward the mapping of the file in a manner that does not use anonymous memory (memory mapping with no backing file or device). Initially, an anonymous mapping only allocates virtual memory. Anonymous mappings may be created using the MAP_ANONYMOUS flag within mmap( ).

Consistent with embodiments of the present disclosure, the standard code for the page fault routine and tables of the kernel can be used. For instance, the page tables can remain unmodified in that they do not contain extra information or bits to indicate whether or not a page is stored at a remote host. This can be useful for allowing the system to remain compatible with changes and additional development of the (Linux) kernel.

As discussed herein, the address space of a process can include a number of memory segments including, but not necessarily limited to: the program's executable code and static data, the heap, the stack, shared libraries (loaded when the program was created), shared memory segments, and files that have been mapped into the address space (e.g., using mmap( ).

Turning now to the figures, FIG. 1 depicts a block diagram of a system configured to schedule applications between multiple hosts, consistent with embodiments of the present disclosure. The system includes two or more hosts 102, 104, which are communicatively connected by common infrastructure 138. As discussed herein, the hosts can include computer hardware such as processors, memory, input output (I/O) devices, storage devices and others. The common infrastructure can include various interconnection solutions including, but not limited to, local area networks (LANs), crossbar switches, fibre channel over Ethernet or similar solutions.

Each host can be configured to support the execution of a variety of different processes 106, 108. These processes can include, but are not necessarily limited to, application level programs and virtual machines (or guests). The hosts can be configured to each support a file system virtual address space 114 that is shared between the hosts. Consistent with embodiments, the virtual file system is executed on kernels or hypervisors 118, 120 as a single file system having one shared address space. For instance, the virtual file system can be a virtual machine that runs as a Symmetric multi-processing (SMP) or non-uniform memory access (NUMA) aware operating system on both hypervisors operating in parallel.

Consistent with embodiments, the system can be configured to schedule one or more of the processes running on the virtual file system between the available hosts. This scheduling may result in the transfer (or migration) of a process from one host to another, as shown by migrated process 110. The scheduling decision can be carried out by an administrator module in order to achieve a variety of different goals. For instance, the processes can be scheduled to run on a single host (when possible) to allow the other hosts to be placed into a power savings mode. In other instances, the processes can be scheduled to provide load balancing between the hosts (e.g., balancing one or more of processor load, memory usage, power usage and I/O bandwidth).

In a NUMA environment a process running on one host may have access to physical memory located on another host; however, access times for physical memory of a remote host can be longer than access times for physical memory of a local host (the host on which the process running). When a process is migrated, the system can be configured to handle data transfer between the hosts to allow data stored at a remote host (e.g., data corresponding to the address space of the process) to be moved to the local host. Embodiments of the present disclosure provide a mechanism to transfer data from a remote host using an on-demand technique where the data is transferred in response to a memory access request initiated by the migrated process.

Consistent with certain embodiments, the hypervisors can be configured with a page fault routine (or module) 122, 126 that is called when a data access is for a memory location that is not in local memory. The page fault routine can access a page fault table 124, 128 to determine the location of a page corresponding to the requested memory. As discussed herein, a page fault generated for a migrated process 110 can be directed to a distributed shared memory (DSM) module 136. The DSM module can access list 134 that is used to determine whether the requested page is local or on a remote host. If the requested page is on a remote host, the DSM module 136 can establish a connection with a remote DSM module (130) for a host that has the requested page stored in its physical memory. The remote DSM module can retrieve and provide the requested page while updating a corresponding list 132 to indicate that the requested page is no longer local to the corresponding host 102.

Aspects of the present disclosure are directed toward a system in which the DSM modules are configured for use with standard components of the kernels 118, 120. For instance, the kernels 118, 120 can be Linux kernels that use standard kernel level application programming interfaces (APIs) to interface with the DSM modules. In certain embodiments, this is facilitated by intelligently mapping the process address space of the migrated application so that accesses to the process address space trigger a page fault within code of the virtual file system 114.

According to embodiments, the migration of a process includes the creation of a file that contains the data of the address space for the migrated process. This file can then be mapped into the virtual file system 114 such that memory accesses to the process address space trigger a page fault within the virtual file system 114. In certain embodiments, this allows for little (or no) overhead to be used for processes that do not use the distributed shared memory. In embodiments, this can be useful for maintaining compatibility with future development of the (Linux) kernel (e.g., where the page fault API remains substantially unchanged in the updates). Embodiments also allow for the memory to be moved without augmenting existing page tables (e.g., without adding additional bits to indicate that the page is located on a remote host).

Figure 2:
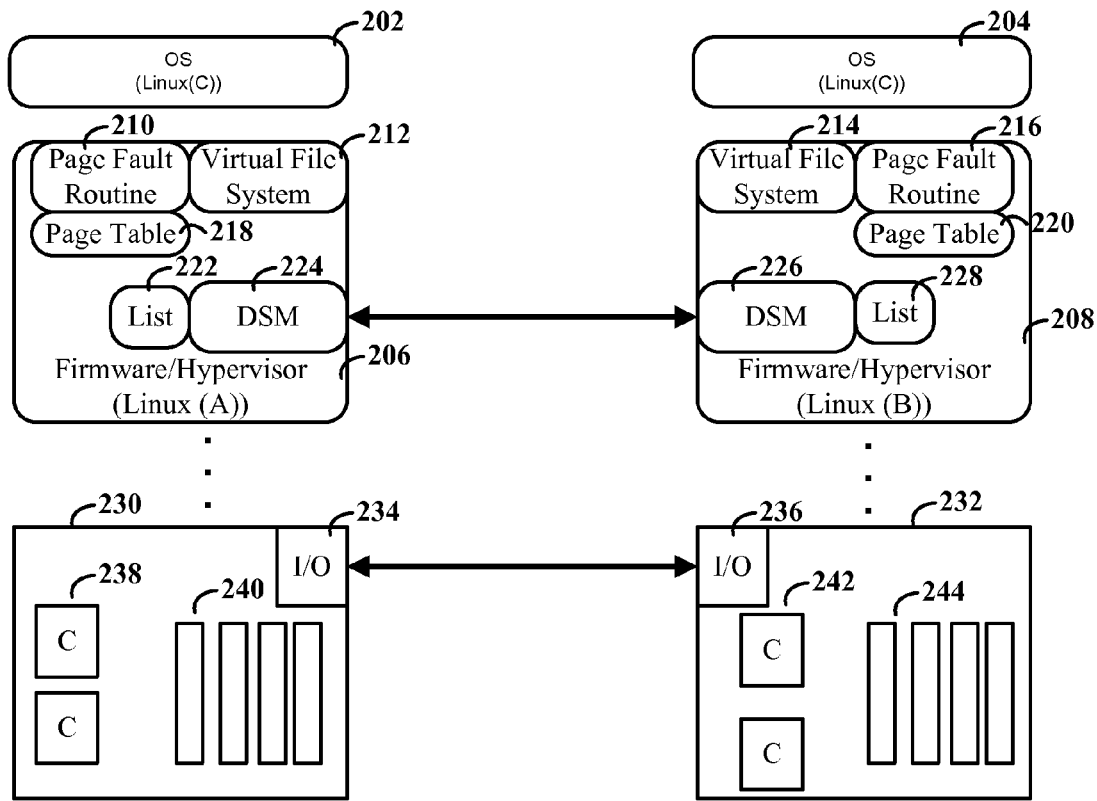
FIG. 2 depicts a block diagram showing relationships between physical components of hosts and logical components that run on the hosts, consistent with embodiments of the present disclosure.

FIG. 2 depicts a block diagram showing relationships between physical components of hosts and logical components that run on the hosts, consistent with embodiments of the present disclosure. Blocks 230, 232 contain a several hardware components that support certain logical structures, such as hypervisors, firmware, file systems, operating systems and modules. The hardware can include, but is not necessarily limited to, computer processors 238, 242, physical memory 240, 244 and I/O devices 234, 236.

Firmware and hypervisors 206, 208 can run on corresponding and respective hardware components from blocks 230 and 232. Hypervisors can provide an interface between the hardware and other processes and file systems, such as operating systems 202, 204. The hypervisors can also support page fault routines 210, 214, page tables 218, 202, virtual file system 212, 214, DSM modules 224, 226 and DSM lists 222, 228.

According to certain embodiments, the hypervisors can be respective Linux kernels A and B. Kernels A and B can support a shared kernel C, which runs on kernels A and B in parallel. A virtualized file system 212, 214 can be associated with this shared kernel. For instance, each of kernels A and B can coordinate a common address space for the virtual file system by maintaining logical consistency between respective instances. Accordingly, the operating systems 202, 204 appear as a single operating system to user level applications.

Figure 3:
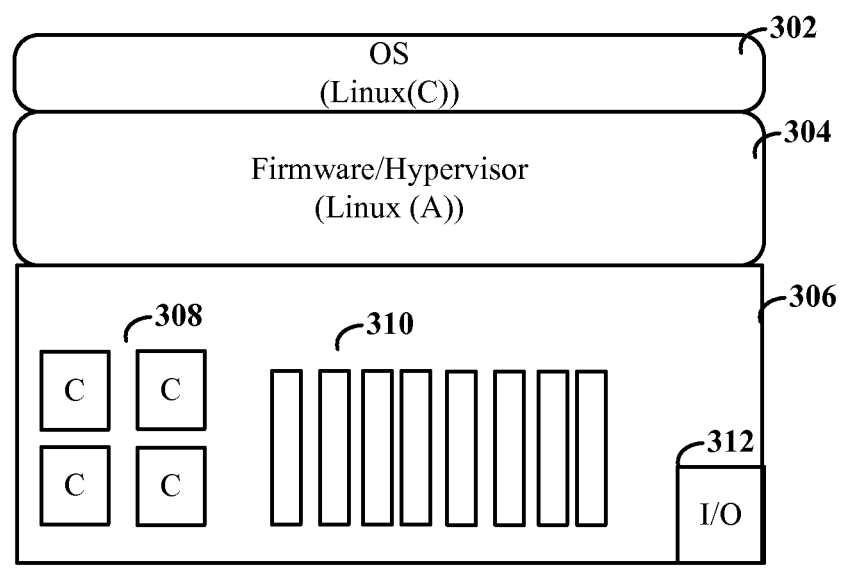
FIG. 3 depicts a block diagram showing how a system can appear to a user level application, consistent with embodiments of the present disclosure.

FIG. 3 depicts a block diagram showing how a system can appear to a user level application, consistent with embodiments of the present disclosure. Block 306 shows hardware that can be physically located on different hosts, such as the hosts depicted in FIG. 2. The hardware can include computer processors 308, physical memory 301 and I/O devices 312. The shared kernel 302 (e.g. Linux(C)) appears as a single kernel running on a single hypervisor. The hardware components (computer processors 308, physical memory 301 and I/O devices 312) each appear to be available to processes running on the shared kernel (with scheduling considerations).

Figure 4:
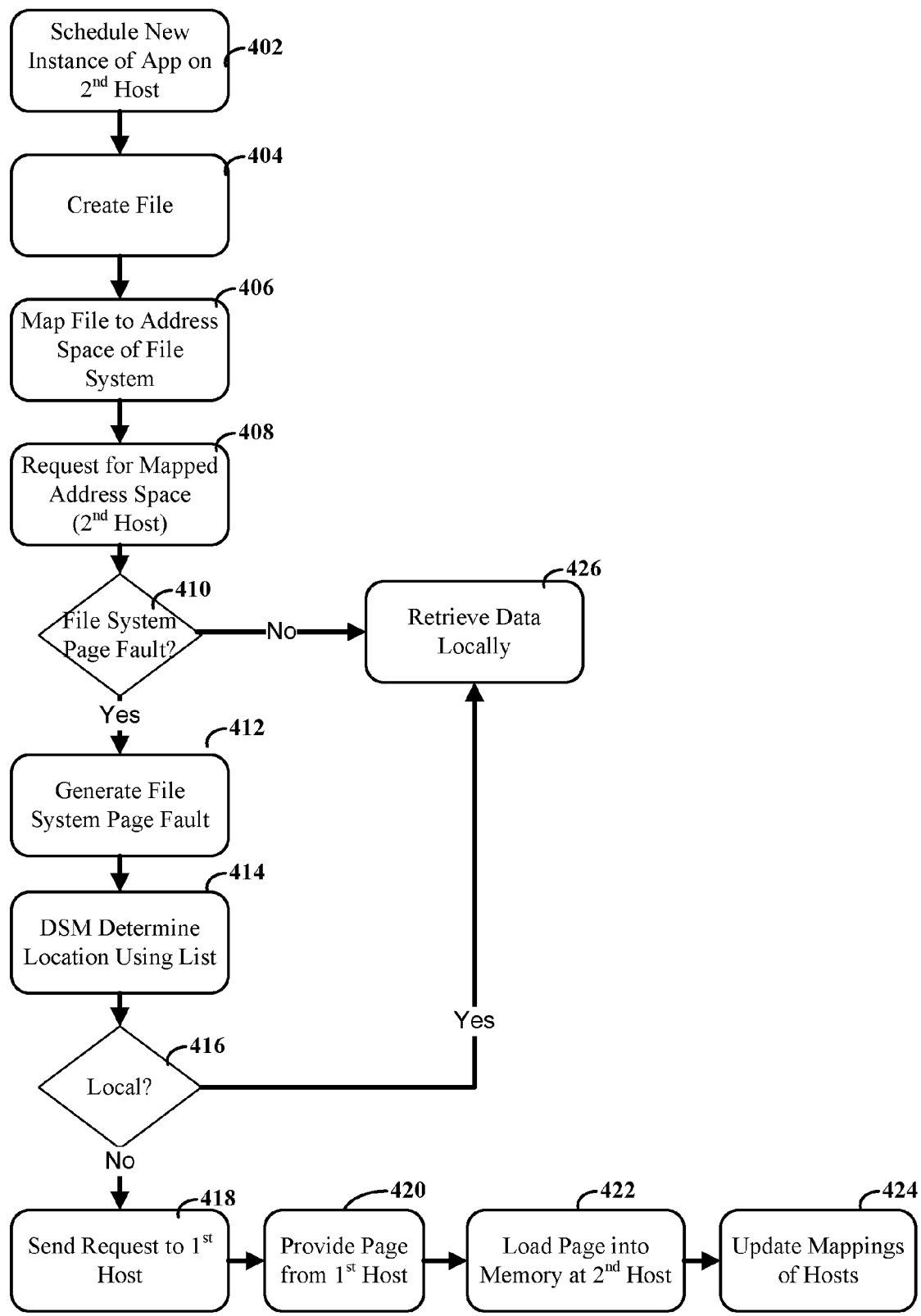
FIG. 4 depicts a flow diagram for scheduling a process to run on a new host, consistent with embodiments of the present disclosure.

FIG. 4 depicts a flow diagram for scheduling a process to run on a new host, consistent with embodiments of the present disclosure. An administer module may determine that a process running on a first host should be scheduled to instead run on a second host, per block 402. In response, a file can be created or opened by an opening process, per block 404. For instance, an opening process can be a hardware emulator (e.g., Quick Emulator or "qemu") running in user space of the hypervisor.

The file can then be mapped into the address space of virtual file system and the calling process, per block 406. For instance, the mapping can be implemented within Linux using the mmap( ) system call. The mapping can be carried out on each host with a respective instance of the virtual file system. The mapping creates a link between the mapping on each host and the shared memory on the first host. Thus, when the migrated process first attempts to access a portion file on the second host (e.g., with a memory read request), per block 408, the file system will determine that a page fault should be generated, per block 410. Otherwise, the page corresponding to the request can be accessed locally, per block 426.

The generated page fault, per block 412, can be handled by a DSM module. The DSM module can determine the location of the requested page using a list that identifies whether the location is local or remote, per blocks 414, 416. If the location is local, then the page corresponding to the request can be accessed locally, per block 426. If the location is not local, then the DSM module can send a request for the page to the first host, per block 418. The first host (using a respective DSM module) can then provide the page to the DSM module of the second host, per block 420. According to embodiments, the second host can then load the received page into its local memory, per block 422. The mappings of each host can be updated accordingly, per block 424.

According to certain embodiments, it may be desirable to proactively move some or all of process address space for a migrated process to the target host (e.g., as opposed to waiting for the migrated process to access the process address space). As part of the migration the address space can be accessed to cause the system to proactively retrieve remotely stored data. For instance, the opening process (e.g., qemu) can issue read request for portions of the address space before starting the migrated instance of the process on the target host.

Consistent with certain embodiments, interrupts that relate to a migrated process can be handled in a similar manner. If the interrupt is determined to be local to the file system, it can be directly injected into the local (target) system or added to the interrupt list. If the interrupt is determined to be remote, then it can be added to the remote (source) system and handed from there.

Figure 5:
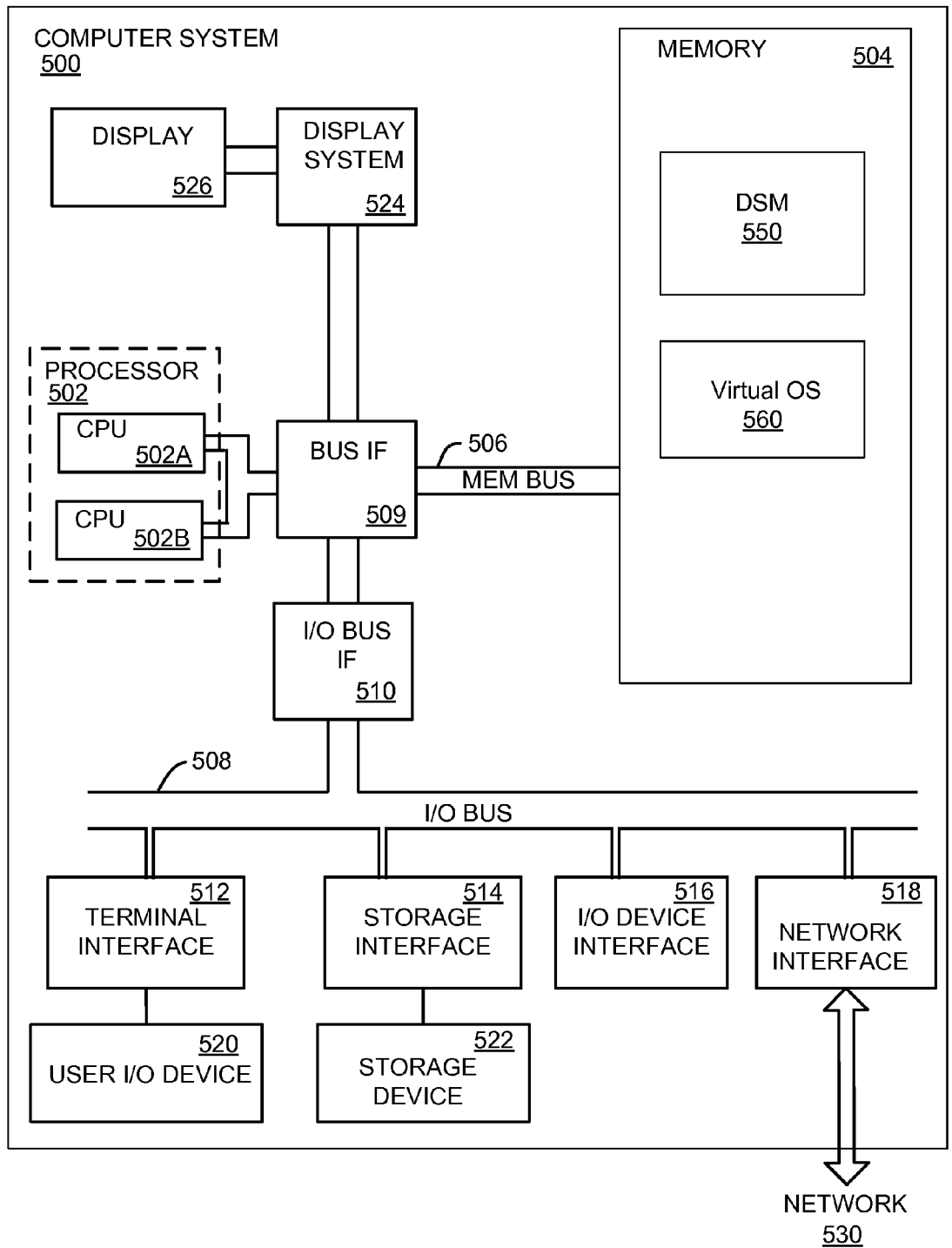
FIG. 5 depicts a high-level block diagram of a computer system for implementing various embodiments.

FIG. 5 depicts a high-level block diagram of a computer system for implementing various embodiments. The mechanisms and apparatus of the various embodiments disclosed herein apply equally to any appropriate computing system. The major components of the computer system 500 include one or more processors 502, a memory 504, a terminal interface 512, a storage interface 514, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions stored in the memory 504 and may include one or more levels of on-board cache.

In embodiments, the memory 504 may include a random-access semiconductor memory, storage device, and/or storage medium (either volatile or non-volatile) for storing and/or encoding data and programs. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can store a DSM tool or module 550 and/or virtual OS 560. Consistent with certain embodiments, these tools can be implemented as part of one or more database systems. These programs and data structures are illustrated as being included within the memory 504 in the computer system 500, however, in other embodiments, some or all of them may be on different computer systems and may be accessed remotely, e.g., via a network. The computer system 500 may use virtual addressing mechanisms that allow the programs of the computer system 500 to behave as if they only have access to a large, single storage entity instead of access to multiple, smaller storage entities. Thus, while the DSM tool 550 and the Virtual OS 560 are illustrated as being included within the memory 504, these components are not necessarily all completely contained in the same storage device at the same time. Further, although the DSM tool 550 and the Virtual OS 560 are illustrated as being separate entities, in other embodiments some of them, portions of some of them, or all of them may be packaged together (e.g., as part of the same monitor thread).

In embodiments, the DSM tool 550 and the Virtual OS 560 may include instructions or statements that execute on the processor 502 or instructions or statements that are interpreted by instructions or statements that execute on the processor 502 to carry out the functions as described herein. In certain embodiments, the DSM tool 550 and the Virtual OS 560 can be implemented in hardware via semiconductor devices, chips, logical gates, circuits, circuit cards, and/or other physical hardware devices in lieu of, or in addition to, a processor-based system. In embodiments, the DSM tool 550 and the Virtual OS 560 may include data in addition to instructions or statements.

The computer system 500 may include a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 522 may be implemented via any type of secondary storage device. The contents of the memory 504, or any portion thereof, may be stored to and retrieved from the storage device 522 as needed. The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 530.

Although the computer system 500 shown in FIG. 5 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 may be implemented as a desktop computer, portable computer, laptop or notebook computer, tablet computer, pocket computer, telephone, smart phone, or any other suitable type of electronic device.

FIG. 5 depicts a representative of certain major components of the computer system 500. Individual components, however, may have greater complexity than represented in FIG. 5, components other than or in addition to those shown in FIG. 5 may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different manners, including using various computer applications, routines, components, programs, objects, modules, data structures, etc., which may be referred to herein as "software," "computer programs," or simply "programs."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A method for scheduling a process between first and second hosts that use a virtual file system, the method comprising:

scheduling the process, running on a first hypervisor of the first host, to run on a second hypervisor of the second host, wherein the first hypervisor includes a first page table, a first list of file locations, and a first distributed shared memory (DSM) module, and wherein the second hypervisor includes a second page table, a second list of file locations, and a second DSM module;

identifying a process address space for the process, wherein the process address space holds data content;

creating a file that maps to the process address space;

mapping the file to address space of the virtual file system that is shared between the first host and the second host using an mmap( )system call;

running the process on the second hypervisor;

generating a page fault, in response to the process requesting access to the file in the virtual file system and by referencing the second page table, wherein the second page table indicates that data content of the file is not stored in physical memory of the second host;

determining, by the second DSM module, that the file access request is for data that is stored in physical memory of the first host by referencing the second list in the second hypervisor, wherein referencing the second list does not modify the second page table; and transferring, by the first DSM module in connection with the second DSM module, in response to the determining, the data from the physical memory of the first host to the physical memory of the second host, wherein the second page table is updated with page associated with transferred data, and wherein the first and second page tables are not modified to include additional information or bits to indicate whether or not the page is stored at a remote host.

2. The method of claim 1, further comprising generating the second list on the second hypervisor, that specifies whether pages corresponding to memory of the process address space are stored on the second host and wherein determining that the file access request is for data that is stored in the physical memory of the first host is based upon the second list.

3. The method of claim 1, wherein transferring the data from the physical memory of the first host to the physical memory of the second host includes transferring the data using a network port connection between the first hypervisor and the second hypervisor.

4. The method of claim 2, further comprising creating the first list, on the first hypervisor, that specifies whether pages corresponding to memory of the process address space are stored on the first host, wherein creating and modifying the first list does not include modifying the first page table.

5. The method of claim 4, further comprising updating the first list by removing a page entry corresponding to the data transferred from the physical memory of the first host.

6. The method of claim 1, wherein the first and second hypervisors are respective Linux kernels.

7. The method of claim 6, wherein the virtual file system corresponds to another Linux kernel running in parallel on each of the first and second hypervisors.

* * * * *